United States Patent
Moon et al.

(10) Patent No.: US 11,515,902 B2
(45) Date of Patent: Nov. 29, 2022

(54) METHOD AND APPARATUS FOR PHASE ERROR COMPENSATION HAVING TOLERANCE TO CYCLIC SLIP

(71) Applicant: ELECTRONICS AND TELECOMMUNICATIONS RESEARCH INSTITUTE, Daejeon (KR)

(72) Inventors: Sang Rok Moon, Daejeon (KR); Minkyu Sung, Daejeon (KR); Eon-sang Kim, Daejeon (KR); Won Kyoung Lee, Daejeon (KR); Seung-Hyun Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/514,849

(22) Filed: Oct. 29, 2021

(65) Prior Publication Data

US 2022/0247439 A1 Aug. 4, 2022

(30) Foreign Application Priority Data

Feb. 4, 2021 (KR) .......................... 10-2021-0016217

(51) Int. Cl.
*H04B 1/12* (2006.01)
*H04B 17/29* (2015.01)

(52) U.S. Cl.
CPC ............... *H04B 1/12* (2013.01); *H04B 17/29* (2015.01)

(58) Field of Classification Search
CPC .................................. H04B 1/12; H04B 17/29
See application file for complete search history.

(56) References Cited

U.S. PATENT DOCUMENTS 7,333,548 B2 * 2/2008 Chen ................... H04L 27/2695
375/326
8,401,120 B1 * 3/2013 Ozgur .................. H04L 1/0047
375/376

(Continued)

FOREIGN PATENT DOCUMENTS

KR 10-2009-0054094 A 5/2009
KR 10-2018-0106573 A 10/2018

(Continued)

OTHER PUBLICATIONS

Tsuyoshi Yoshida et al., "Cycle Slip Compensation with Polarization Block Coding for Coherent Optical Transmission," IEEE Signal Processing Magazin 5. 57-69, Mar. 2014.

*Primary Examiner* — Dac V Ha
(74) *Attorney, Agent, or Firm* — LRK Patent Law Firm

(57) ABSTRACT

Disclosed is a method and apparatus for phase error compensation having tolerance to a cyclic slip. The method includes determining first phase error candidates based on symbol phases of a first block of a received signal, determining an initial estimation error according to the first phase error candidates, determining second phase error candidates based on symbol phases of a second block of the received signal, determining a final estimation error according to the initial estimation error and the second phase error candidates, and compensating for a phase of the received signal according to the final estimation error.

15 Claims, 4 Drawing Sheets

(56) References Cited

U.S. PATENT DOCUMENTS

| | | |
|---|---|---|
| 8,527,844 B2 | 9/2013 | Kondou et al. |
| 8,588,343 B2 | 11/2013 | Moon et al. |
| 9,209,843 B2 | 12/2015 | Eliaz |
| 9,496,967 B1 | 11/2016 | Castrillon et al. |
| 9,804,327 B1 | 10/2017 | Park et al. |
| 2009/0011722 A1* | 1/2009 | Kleider .................... H04B 1/59 |
| | | 455/101 |
| 2015/0156036 A1* | 6/2015 | Genossar .......... H04L 25/03038 |
| | | 375/232 |
| 2017/0373910 A1* | 12/2017 | Shahmohammadian .................... |
| | | H04L 5/006 |

FOREIGN PATENT DOCUMENTS

| | | |
|---|---|---|
| KR | 10-2019-0081695 A | 7/2019 |
| KR | 10-2021-0053327 A | 5/2021 |
| KR | 10-2021-0126153 A | 10/2021 |

* cited by examiner

METHOD AND APPARATUS FOR PHASE ERROR COMPENSATION HAVING TOLERANCE TO CYCLIC SLIP

CROSS-REFERENCE TO RELATED APPLICATION

This application claims the benefit of Korean Patent Application No. 10-2021-0016217 filed on Feb. 4, 2021, in the Korean Intellectual Property Office, the entire disclosure of which is incorporated herein by reference for all purposes.

BACKGROUND

1. Field of the Invention

One or more example embodiments relate to a method and apparatus for phase error compensation, and more particularly, to a method and apparatus for phase error compensation having tolerance to a cyclic slip and no performance deterioration.

2. Description of Related Art

In a coherent communication system, a phase error is one of the critical factors that degrade signal quality. Phase errors may be caused by various factors such as additive white Gaussian noise, phase noise, and a frequency offset. In addition, the effect of phase errors is increasing with the rise of a carrier frequency according to the recent increase in the rate of signal transmission. Thus, there is a demand for an algorithm that operates stably at a high phase error.

Conventional phase error compensation is performed in a manner of estimating a phase error caused by noise in a received signal and compensating for a phase error using the estimation error. However, when great noise instantaneously is input, a cyclic slip may occur.

Phase error compensation methods to prevent the cyclic slip includes a method using differential coding, a phase error compensation method of correcting a cyclic slip by periodically transmitting agreed symbols, and a block-based phase error compensation method of suppressing a possibility of occurrence of a cyclic slip by compensating for a phase with an average value of consecutive symbol phases.

However, the method using differential coding causes more errors at the same signal noise. In addition, the phase error compensation method of correcting a cyclic slip needs to periodically transmit agreed symbols and thus, have an increase in overhead and may not compensate for a cyclic slip until agreed symbols arrive. Further, the block-based phase error compensation method estimates and compensates for a phase with an average of a plurality of symbols and thus, may not accurately compensate for a phase of an individual symbol.

Accordingly, there is a demand for a phase error compensation method that reduces the possibility of occurrence of a cyclic slip while preventing a decrease in compensation performance.

SUMMARY

Example embodiments provide a method and apparatus for reducing the possibility of occurrence of a cyclic slip by determining an estimation error using multiple symbols, and maintaining the accuracy of noise compensation by performing actual compensation with an estimation error determined using a small number of symbols.

According to an aspect, there is provided a method for compensating for a phase error of a signal, the method including determining first phase error candidates based on symbol phases of a first block of a received signal, determining an initial estimation error according to the first phase error candidates, determining second phase error candidates based on symbol phases of a second block of the received signal, determining a final estimation error according to the initial estimation error and the second phase error candidates, and compensating for a phase of the received signal according to the final estimation error.

The first block may include N reception symbols among reception symbols included in the received signal, and the second block may include M reception symbols among the reception symbols included in the first block, wherein M may be an integer less than N.

The determining of the first phase error candidates may include determining the first phase error candidates according to phase differences between an average value of the symbol phases of the first block and points included in a constellation.

The determining of the initial estimation error may include determining a smallest first phase error candidate of the first phase error candidates as the initial estimation error.

The determining of the second phase error candidates may include determining the second phase error candidates according to phase differences between an average value of the symbol phases of the second block and points included in a constellation.

The determining of the final estimation error may include comparing each of the second phase error candidates with the initial estimation error, and determining a second phase error candidate having a smallest difference from the initial estimation error, of the second phase error candidates, as the final estimation error.

The compensating may include compensating for the phase of the received signal by applying a reciprocal of the final estimation error to reception symbols included in the second block.

According to an aspect, there is provided an apparatus for compensating for a phase error of a signal, the apparatus including a first phase error candidate determiner configured to determine first phase error candidates based on symbol phases of a first block of a received signal, an initial estimation error determiner configured to determine an initial estimation error according to the first phase error candidates, a second phase error candidate determiner configured to determine second phase error candidates based on symbol phases of a second block of the received signal, a final estimation error determiner configured to determine a final estimation error according to the initial estimation error and the second phase error candidates, and a phase compensator configured to compensate for a phase of the received signal according to the final estimation error.

The first block may include N reception symbols among reception symbols included in the received signal, and the second block may include M reception symbols among the reception symbols included in the first block, wherein M may be an integer less than N.

The first phase error candidate determiner may be further configured to determine the first phase error candidates according to phase differences between an average value of the symbol phases of the first block and points included in a constellation.

The initial estimation error determiner may be further configured to determine a smallest first phase error candidate of the first phase error candidates as the initial estimation error.

The second phase error candidate determiner may be further configured to determine the second phase error candidates according to phase differences between an average value of the symbol phases of the second block and points included in a constellation.

The final estimation error determiner may be further configured to compare each of the second phase error candidates with the initial estimation error, and determine a second phase error candidate having a smallest difference from the initial estimation error, of the second phase error candidates, as the final estimation error.

The phase compensator may be further configured to compensate for the phase of the received signal by applying a reciprocal of the final estimation error to reception symbols included in the second block.

Additional aspects of example embodiments will be set forth in part in the description which follows and, in part, will be apparent from the description, or may be learned by practice of the disclosure.

According to example embodiments, it is possible to reduce the possibility of occurrence of a cyclic slip by determining an estimation error using multiple symbols, and maintain the accuracy of noise compensation by performing actual compensation with an estimation error determined using a small number of symbols.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
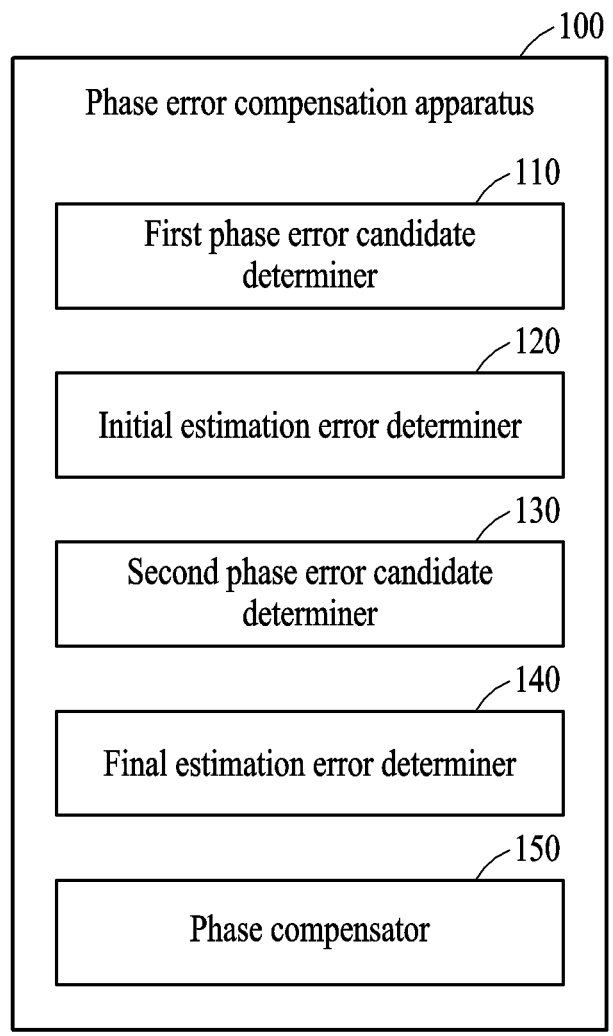
FIG. 1 illustrates a phase error compensation apparatus according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 illustrates a phase error compensation apparatus according to an example embodiment.

Referring to FIG. 1, a phase error compensation apparatus 100 may include a first phase error candidate determiner 110, an initial estimation error determiner 120, a second phase error candidate determiner 130, a final estimation error determiner 140, and a phase compensator 150. At this time, the first phase error candidate determiner 110, the initial estimation error determiner 120, the second phase error candidate determiner 130, the final estimation error determiner 140, and the phase compensator 150 may be different processors, or modules included in a program performed by a single processor.

The first phase error candidate determiner 110 may determine first phase error candidates based on symbol phases of a first block of a received signal. At this time, the first block may include N reception symbols among reception symbols included in the received signal. Specifically, the first phase error candidate determiner 110 may determine the first phase error candidates according to phase differences between an average value of the symbol phases of the first block and points included in a constellation.

The initial estimation error determiner 120 may determine an initial estimation error according to the first phase error candidates determined by the first phase error candidate determiner 110. Specifically, the initial estimation error determiner 120 may determine a smallest first phase error candidate of the first phase error candidates as the initial estimation error.

The second phase error candidate determiner 130 may determine second phase error candidates based on symbol phases of a second block of the received signal. At this time, the second block may include M reception symbols among the reception symbols included in the first block, where M may be an integer less than N. That is, the second block may be a subset including a portion of the reception symbols included in the first block. Specifically, the second phase error candidate determiner 130 may determine the second phase error candidates according to phase differences between an average value of the symbol phases of the second block and points included in a constellation.

The final estimation error determiner 140 may determine a final estimation error according to the initial estimation error determined by the initial estimation error determiner 120 and the second phase error candidates determined by the second phase error candidate determiner 130. Specifically, the final estimation error determiner 140 may compare each of the second phase error candidates with the initial estimation error. Then, the final estimation error determiner 140 may determine a second phase error candidate having a smallest difference from the initial estimation error, of the second phase error candidates, as the final estimation error.

The phase compensator 150 may compensate for a phase of the received signal according to the final estimation error determined by the final estimation error determiner 140. Specifically, the phase compensator 150 may compensate for the phase of the received signal by applying a reciprocal of the final estimation error to the reception symbols included in the second block.

When more symbols are used to determine a phase error candidate, the tolerance to a cyclic slip may increase, but the accuracy of noise compensation for individual symbols may decrease. Conversely, when fewer symbols are used to determine a phase error candidate, the tolerance to a cyclic slip may decrease, but the accuracy of noise compensation for individual symbols may increase.

The phase error compensation apparatus 100 may reduce the possibility of occurrence of a cyclic slip by determining an estimation error using multiple symbols, and maintain the accuracy of noise compensation by performing actual compensation with an estimation error determined using a small number of symbols.

Figure 2:
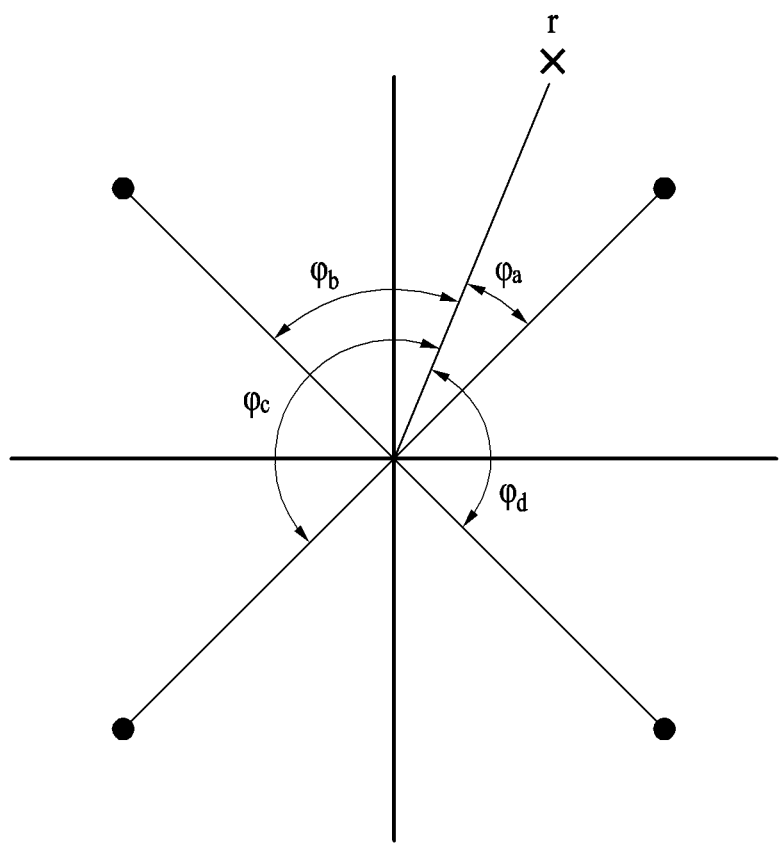
FIG. 2 illustrates an example of a conceptual diagram of phase error estimation according to an example embodiment.

FIG. 2 illustrates a concept of phase error estimation, assuming that a received signal is a quadrature phase shift keying (QPSK) signal.

A phase error may be calculated by estimating a phase between a received signal r and a point included in a constellation. When the received signal is a QPSK signal, four points are included in the constellation as shown in FIG. 2. Thus, there may be four phase error candidates φa, φb, φc, and φd.

At this time, the phase error compensation apparatus 100 may determine a smallest value (pa of the phase error candidates as a final estimation error that is a finally estimated error. In addition, the phase error compensation apparatus 100 may compensate for a phase error by multiplying the received signal by a reciprocal of the final estimation error.

Figure 3:
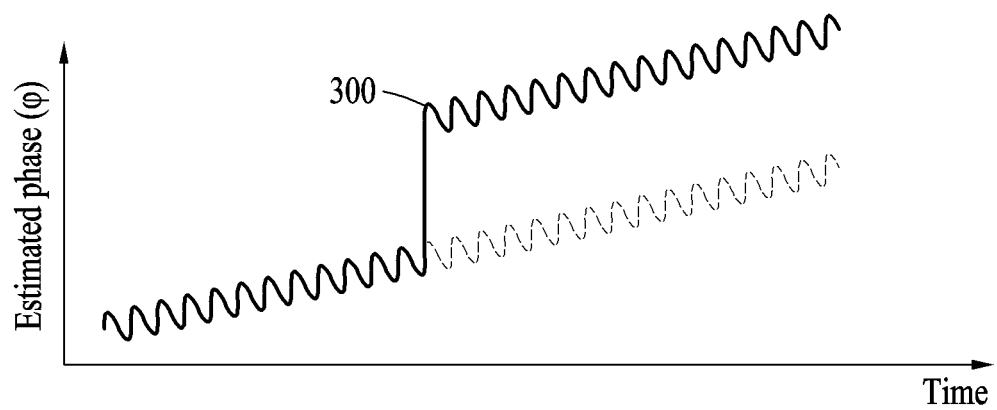
FIG. 3 illustrates a cyclic slip.

FIG. 3 illustrates a cyclic slip.

A phase error may be estimated as a smallest value of phase differences between a received signal and points included in a constellation. Thus, when a phase error becomes greater than a predetermined value instantaneously as great noise enters, phase error misestimation may occur.

For example, when the received signal is a QPSK signal as shown in FIG. 2 and the phase error is greater than π/2, the phase error may be misestimated. At this time, a difference between a misestimated phase error 300 and an actual phase error may be an integer multiple of π/2. In addition, the misestimated phase error may be continuously added to an estimated value of a phase of a subsequent symbol.

Phase error misestimation caused by great noise is called a cyclic slip, and as shown in FIG. 3, a cyclic slip may cause a catastrophic error that a misestimated phase error is added to all signals received after the cyclic slip occurs.

In addition, a phase error caused by a cyclic slip may not be recognized by a conventional phase error compensation apparatus due to the symmetry of a constellation. For example, a constellation of a quadrature amplitude modulation (QAM) signal has symmetry with respect to a phase of π/2, and a constellation of an m-ary phase shift keying (m-ary PSK) signal has symmetry with respect to a phase of 2π/m. Therefore, the phase error caused by the cyclic slip is an integer multiple of λ/2 for the QAM signal and an integer multiple of 2λ/m for the m-PSK signal. Thus, the conventional phase error compensation apparatus may fail to recognize the phase errors and continuously cause errors.

Figure 4:
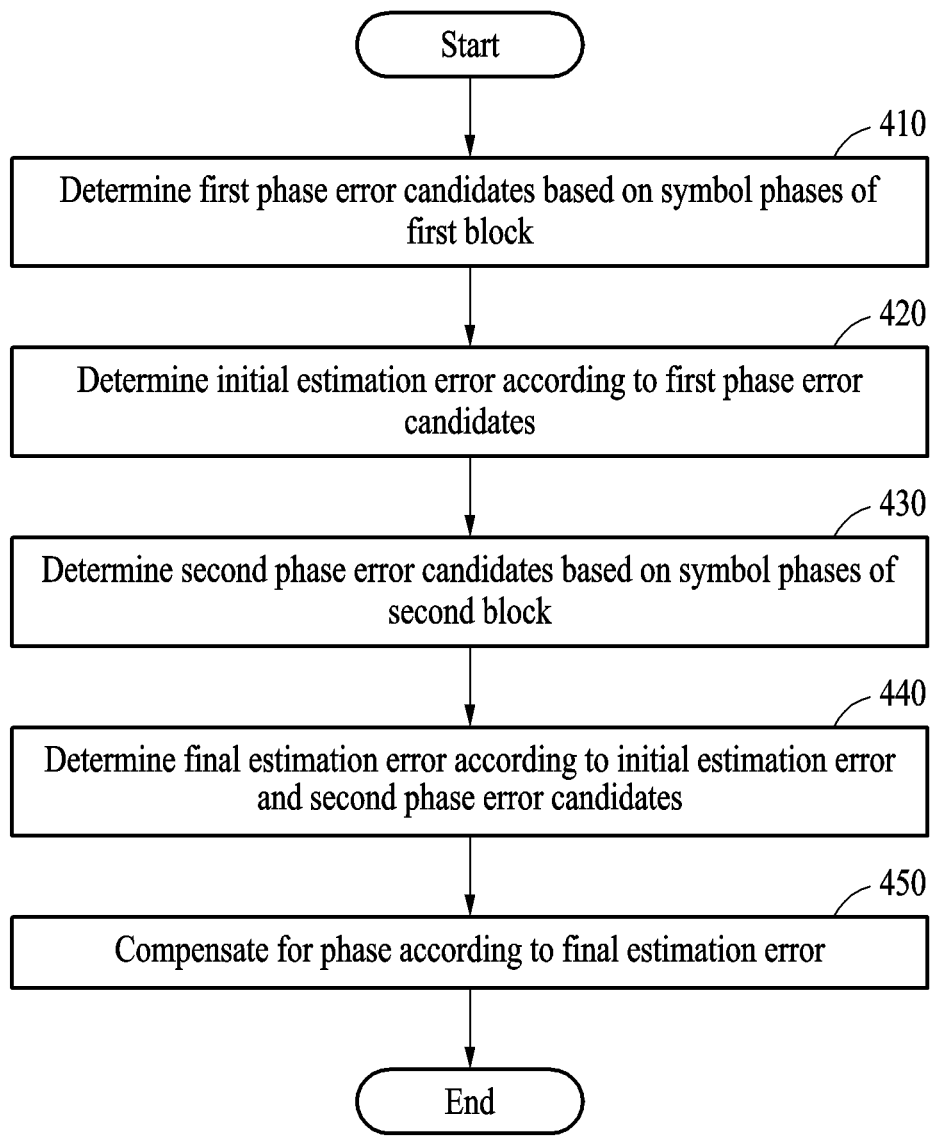
FIG. 4 is a flowchart illustrating a phase error compensation method according to an example embodiment.

FIG. 4 is a flowchart illustrating a phase error compensation method according to an example embodiment.

In operation 410, the first phase error candidate determiner 110 may determine first phase error candidates based on symbol phases of a first block including N reception symbols. At this time, the first phase error candidate determiner 110 may determine the first phase error candidates according to phase differences between an average value of the symbol phases of the first block and points included in a constellation.

In operation 420, the initial estimation error determiner 120 may determine an initial estimation error according to the first phase error candidates determined in operation 410. At this time, the initial estimation error determiner 120 may determine a smallest first phase error candidate of the first phase error candidates as the initial estimation error φ1.

In operation 430, the second phase error candidate determiner 130 may determine second phase error candidates based on symbol phases of a second block that is a subset of the first block. At this time, the second phase error candidate determiner 130 may determine the second phase error candidates according to phase differences between an average value of the symbol phases of the second block and points included in a constellation.

In operation 440, the final estimation error determiner 140 may determine a final estimation error according to the initial estimation error determined in operation 420 and the second phase error candidates determined in operation 430. At this time, the final estimation error determiner 140 may determine a second phase error candidate having a smallest difference from the initial estimation error φ1, of the second phase error candidates, as the final estimation error.

In operation 450, the phase compensator 150 may compensate for a phase of the received signal according to the final estimation error determined in operation 440. At this time, the phase compensator 150 may compensate for the phase of the received signal by multiplying the reception symbols included in the second block by a reciprocal of the final estimation error.

According to example embodiments, it is possible to reduce the possibility of occurrence of a cyclic slip by determining an estimation error using multiple symbols, and maintain the accuracy of noise compensation by performing actual compensation with an estimation error determined using a small number of symbols.

Meanwhile, the phase error compensation apparatus or the phase error compensation method may be written in a computer-executable program and may be implemented as various recording media such as magnetic storage media, optical reading media, or digital storage media.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in to order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method for compensating for a phase error of a signal, the method comprising:
   determining first phase error candidates based on symbol phases of a first block of a received signal;
   determining an initial estimation error according to the first phase error candidates;
   determining second phase error candidates based on symbol phases of a second block of the received signal;
   determining a final estimation error according to the initial estimation error and the second phase error candidates; and
   compensating for a phase of the received signal according to the final estimation error.

2. The method of claim 1, wherein:
   the first block comprises N reception symbols among reception symbols included in the received signal, where N is an integer, and
   the second block comprises M reception symbols among the reception symbols included in the first block, where M is an integer less than N.

3. The method of claim 1, wherein the determining of the first phase error candidates comprises determining the first phase error candidates according to phase differences between an average value of the symbol phases of the first block and points included in a constellation.

4. The method of claim 1, wherein the determining of the initial estimation error comprises determining a smallest first phase error candidate of the first phase error candidates as the initial estimation error.

5. The method of claim 1, wherein the determining of the second phase error candidates comprises determining the second phase error candidates according to phase differences between an average value of the symbol phases of the second block and points included in a constellation.

6. The method of claim 1, wherein the determining of the final estimation error comprises comparing each of the second phase error candidates with the initial estimation error, and determining a second phase error candidate having a smallest difference from the initial estimation error, of the second phase error candidates, as the final estimation error.

7. The method of claim 1, wherein the compensating comprises compensating for the phase of the received signal by applying a reciprocal of the final estimation error to reception symbols included in the second block.

8. A non-transitory computer-readable storage medium storing instructions that, when executed by a processor, cause the processor to perform the method of claim 1.

9. An apparatus for compensating for a phase error of a signal, the apparatus comprising:
   a processor, and a memory having instructions stored thereon executed by the processor to perform:
   a first phase error candidate determiner configured to determine first phase error candidates based on symbol phases of a first block of a received signal;
   an initial estimation error determiner configured to determine an initial estimation error according to the first phase error candidates;

a second phase error candidate determiner configured to determine second phase error candidates based on symbol phases of a second block of the received signal;

a final estimation error determiner configured to determine a final estimation error according to the initial estimation error and the second phase error candidates; and a phase compensator configured to compensate for a phase of the received signal according to the final estimation error.

10. The apparatus of claim 9, wherein:

the first block comprises N reception symbols among reception symbols included in the received signal, where N is an integer, and the second block comprises M reception symbols among the reception symbols included in the first block, where M is an integer less than N.

11. The apparatus of claim 9, wherein the first phase error candidate determiner is further configured to determine the first phase error candidates according to phase differences between an average value of the symbol phases of the first block and points included in a constellation.

12. The apparatus of claim 9, wherein the initial estimation error determiner is further configured to determine a smallest first phase error candidate of the first phase error candidates as the initial estimation error.

13. The apparatus of claim 9, wherein the second phase error candidate determiner is further configured to determine the second phase error candidates according to phase differences between an average value of the symbol phases of the second block and points included in a constellation.

14. The apparatus of claim 9, wherein the final estimation error determiner is further configured to compare each of the second phase error candidates with the initial estimation error, and determine a second phase error candidate having a smallest difference from the initial estimation error, of the second phase error candidates, as the final estimation error.

15. The apparatus of claim 9, wherein the phase compensator is further configured to compensate for the phase of the received signal by applying a reciprocal of the final estimation error to reception symbols included in the second block.

* * * * *